(12) United States Patent
Hirata et al.

(10) Patent No.: US 8,537,646 B2
(45) Date of Patent: Sep. 17, 2013

(54) THERMALLY-ASSISTED MAGNETIC RECORDING HEAD HAVING PHOTOELECTRIC WIRING LINES INTEGRALLY FORMED ON WAVEGUIDE

(75) Inventors: Masakazu Hirata, Chiba (JP); Manabu Oumi, Chiba (JP); Mizuaki Suzuki, Chiba (JP); Majung Park, Chiba (JP)

(73) Assignee: Seiko Instruments Inc. (JP)

( * ) Notice: Subject to any disclaimer, the term of this patent is extended or adjusted under 35 U.S.C. 154(b) by 186 days.

(21) Appl. No.: 12/736,992

(22) PCT Filed: May 19, 2009

(86) PCT No.: PCT/JP2009/059210
§ 371 (c)(1),
(2), (4) Date: Feb. 7, 2011

(87) PCT Pub. No.: WO2009/147945
PCT Pub. Date: Dec. 10, 2009

(65) Prior Publication Data
US 2011/0122738 A1    May 26, 2011

(30) Foreign Application Priority Data

Jun. 2, 2008 (JP) .................................. 2008-144980
Jan. 26, 2009 (JP) .................................. 2009-014486

(51) Int. Cl.
*G11B 11/00* (2006.01)

(52) U.S. Cl.
USPC ..................................................... 369/13.33

(58) Field of Classification Search
USPC .......... 369/13.33, 13.13, 13.32, 13.02, 13.17, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| | | | | |
|---|---|---|---|---|
| 2008/0115962 | A1* | 5/2008 | Juni et al. ...................... | 174/250 |
| 2010/0085664 | A1* | 4/2010 | Hirata et al. ............... | 360/245.4 |
| 2011/0075527 | A1* | 3/2011 | Hirata et al. ............... | 369/13.33 |
| 2011/0188355 | A1* | 8/2011 | Hirata et al. ............... | 369/13.33 |
| 2011/0194809 | A1* | 8/2011 | Nishio et al. .................... | 385/14 |
| 2011/0199868 | A1* | 8/2011 | Hirata et al. ............... | 369/13.33 |

FOREIGN PATENT DOCUMENTS

| | | |
|---|---|---|
| JP | 01227105 | 9/1989 |
| JP | 2000131554 | 5/2000 |
| JP | 2007335027 | 12/2007 |
| JP | 2008090954 | 4/2008 |
| JP | 1926089 | 5/2008 |

* cited by examiner

*Primary Examiner* — Tan X Dinh
(74) *Attorney, Agent, or Firm* — Adams & Wilks

(57) ABSTRACT

An information recording and reproduction apparatus has a magnetic recording medium, a light source that outputs a light beam to heat the medium, and a near-field light head confronting a surface of the medium. An optical waveguide introduces a light beam from the light source into the head to generate near-field light. A control section supplies a current to a recording element of the head for generating a recording magnetic field in a direction of the medium. A photoelectric composite wiring line has the optical waveguide and electric wiring lines integral with the optical waveguide. The optical waveguide is arranged between the electric wiring lines. The optical waveguide and the electric wiring line branch off from a distal side of the photoelectric composite wiring line so that the optical waveguide is routed to a base end surface of the near-field light head in a state extending approximately linearly.

12 Claims, 9 Drawing Sheets

THERMALLY-ASSISTED MAGNETIC RECORDING HEAD HAVING PHOTOELECTRIC WIRING LINES INTEGRALLY FORMED ON WAVEGUIDE

CROSS-REFERENCE TO RELATED APPLICATIONS

This application is a U.S. national stage application of International Application No. PCT/JP2009/059210 filed May 19, 2009, claiming an earliest priority date of Jun. 2, 2008, and published in a non-English language.

BACKGROUND OF THE INVENTION

1. Technical Field

The present invention relates to an information recording and reproduction apparatus which records and reproduces various kinds of information on and from a magnetic recording medium using spot light obtained by a condensing light beam.

2. Background Art

In recent years, the recording density of the information within a single recording surface has been increasing with increases in the capacity of a hard disk or the like in a computer apparatus. For example, in order to increase the recording capacity per unit area of a magnetic disk, it is necessary to increase the surface recording density. However, as the recording density increases, the recording area per bit occupied on a recording medium decreases. If the bit size is reduced, the energy of the 1-bit information becomes close to heat energy at room temperature. As a result, a problem of thermal demagnetization occurs. For example, the recorded information is reversed or lost due to thermal fluctuation or the like.

An in-plane recording method generally used is a method of performing magnetic recording such that the direction of magnetization faces an in-plane direction of a recording medium. In this method, however, loss of the recording information by thermal demagnetization described above and the like easily occur. Therefore, in order to solve such a problem, there is a shift to a perpendicular recording method which records a magnetization signal in a vertical direction with respect to a recording medium. This method is a method of recording the magnetic information on a recording medium under the principle of bringing single poles close to each other. According to this method, the recording magnetic field faces an almost vertical direction with respect to a recording layer. Since it is difficult for an N pole and an S pole to make a loop within a recording layer surface, the information recorded in a vertical magnetic field tends to maintain the stability in terms of energy. For this reason, this perpendicular recording method is stronger against the thermal demagnetization as compared to the in-plane recording method.

However, in recent years there has been a demand for recording media to have a higher density according to the need for the recording and reproduction of a larger amount of information with higher density. Accordingly, in order to suppress to a minimum an influence between adjacent magnetic domains or thermal fluctuation, recording media with strong coercivity have started to be adopted. For this reason, even in the perpendicular recording method described above, it has been difficult to record the information on a recording medium.

Therefore, in order to solve this problem, there is provided a hybrid magnetic recording method of temporarily reducing the coercivity by locally heating a magnetic domain using spot light, which is obtained by condensing light beam, or near-field light, which is obtained by condensing light beam, and performing writing in the meantime. In particular, when using near-field light, it becomes possible to treat the optical information in a region with a wavelength of light or less, which was not possible in a conventional optical system. Consequently, it is possible to realize high density of recording bits exceeding conventional optical information recording and reproduction apparatus and the like.

Various items are provided as information recording and reproduction apparatuses based on the hybrid magnetic recording method described above. As one of them, there is known an information recording and reproduction apparatus capable of realizing reproduction and recording with super-high resolution, high-speed recording and reproduction, and a high S/N ratio by generating sufficiently large near-field light from a fine aperture by supplying light for generating near-field light to a near-field light head.

As this information recording and reproduction apparatus, there is known a configuration which includes a driving arm (carriage), which can angle-oscillate around a pivot bearing shaft by a voice coil motor (VCM) or the like, and in which a slider provided with a near-field light head is fixed to a distal end of the driving arm. This slider includes a unit substrate bonded to an opposite surface to an ABS-side surface (floating surface) of the slider, that is, an upper surface of the slider, a light source provided on the unit substrate, a propagation layer which is provided on an element forming surface of the unit substrate and which includes an optical path of light emitted from the light source, and a lens section which is provided in the propagation layer in order to adjust propagation of the light emitted from the light source, as disclosed in Patent Citation 1, for example.

The information recording and reproduction apparatus described above disposes the slider at the desired position on a disk by making the slider perform scanning on the disk by moving the driving arm around the pivot bearing shaft. Then, the near-field light emitted from the light source and the recording magnetic field generated from the slider are made to cooperate with each other so that the information can be recorded on the disk. In addition, the ABS of the slider is configured to float such that when air pressure is applied to the slider by the undulation of a disk or the like, it follows the air pressure.

RELATED ART DOCUMENT

Citation List

[Patent Document 1] Japanese Unexamined Patent Publication No. 2007-335027

In the conventional information recording and reproduction apparatus described above, however, the light source is mounted on the unit substrate bonded to the upper surface of the slider. Accordingly, since the heat generated from the light source is directly transferred to the slider, the slider is heated. If the slider is heated, the slider may warp or thermal expansion may occur. The ABS of the slider described above is configured such that the slider floats according to air pressure when the air pressure is applied to the slider by the undulation of a disk or the like. If this ABS deforms by warpage or thermal expansion of the slider, there is a problem that the floating characteristic of the slider changes. In addition, if the slider is heated, the characteristic and the like of a reproduction element of the slider are affected. Accordingly, recording and reproduction of the information may not be controlled very accurately and correctly.

In order to solve this problem, it may also be considered to dispose a light source at a position distant from the slider. In this case, however, the layout efficiency of an optical waveguide for guiding light beam emitted from the light source toward the slider becomes a problem.

Specifically, when an optical waveguide and an electric wiring line are routed to the slider, it is necessary to fix the optical waveguide and the electric wiring line separately. Accordingly, there is a problem in that the manufacturing efficiency is noticeably reduced and the manufacturing cost is increased.

Moreover, if the optical waveguide is routed from the light source to the slider while being bent several times when guiding light beam emitted from the light source to the slider, guiding loss of light beam passing through the optical waveguide becomes large. Accordingly, there is a problem in that the light propagation efficiency is reduced.

Therefore, the present invention has been made in view of the foregoing problems, and it is an object of the present invention to provide an information recording and reproduction apparatus capable of suppressing an influence of heat generated from a light source in order to improve manufacturing efficiency and reduce the manufacturing cost.

SUMMARY OF THE INVENTION

The present invention provides the following means in order to solve the problem.

An information recording and reproduction apparatus related to the present invention includes: a magnetic recording medium which rotates in a fixed direction; a light source which emits light beam in order to heat the magnetic recording medium; a pivot shaft disposed at the outside of the magnetic recording medium; a carriage formed so as to be rotatable around the pivot shaft; a slider which is supported at a distal side of the carriage so as to face a surface of the magnetic recording medium; and a control unit that controls an operation of the slider. The slider has a spot light generating element which generates spot light from the light beam. The information recording and reproduction apparatus records the information on the magnetic recording medium by heating the magnetic recording medium with the spot light and causing magnetization reversal by applying a recording magnetic field to the magnetic recording medium and is characterized in that a photoelectric composite wiring line is provided in which an optical waveguide, which introduces light beam emitted from the light source into the slider, and a plurality of electric wiring lines, which electrically connects the slider and the control unit to each other, are integrally formed.

In the information recording and reproduction apparatus related to the present invention, the information can be recorded on a magnetic recording medium, such as a rotating optical disk, by a hybrid magnetic recording method of making spot light and a recording magnetic field cooperate with each other. First, the slider supported at the tip of the suspension is moved in a direction parallel to the surface of the magnetic recording medium in order to scan the magnetic recording medium. Accordingly, the slider can be located at the desired position on the magnetic recording medium. Subsequently, light beam emitted from the light source are guided to the slider. Then, the light beam guided to the slider are condensed by the optical system. Then, the spot light generating element can generate spot light from the condensed light beam. In addition, the spot light generating element is formed by an optically fine aperture, a protruding portion formed in a nanometer size, and the like.

In addition, the magnetic recording medium is locally heated by the spot light and accordingly, the coercivity is temporarily reduced. As a result, various kinds of information can be recorded and reproduced on and from the recording medium using the slider.

In particular, according to the information recording and reproduction apparatus of the present invention, since the optical waveguide and the electric wiring lines are integrally formed as the photoelectric composite wiring line, the optical waveguide and the electric wiring lines can be simultaneously fixed. Accordingly, a lowering in manufacturing efficiency can be prevented. Therefore, even when the light source is disposed at a position distant from the slider, the photoelectric composite wiring line can be easily routed to the slider. As a result, the influence of heat generated from the light source can be suppressed.

In addition, a distance between the optical waveguide and each electric wiring line or a distance between electric wiring lines can be reduced compared with the case where the optical waveguide and the electric wiring lines are separately formed. Moreover, since it is not necessary to cover an insulating material or the like for each electric wiring line, the photoelectric composite wiring line can be made small and light. Therefore, since obstruction of the photoelectric composite wiring line in posture control of the slider can be prevented, there is little influence on the floating characteristic of the slider, tracking accuracy, and the like.

In addition, since the layout efficiency of the photoelectric composite wiring line can be improved, bending of the photoelectric composite wiring line is small. As a result, since the guiding loss of light beam passing through the photoelectric composite wiring line can be reduced, the light propagation efficiency can be maintained.

Moreover, the information recording and reproduction apparatus related to the present invention is characterized in that the optical waveguide has a core, which guides the light beam emitted from the light source in a total reflection condition, and a cladding, which is formed of a material with a refractive index lower, than a refractive index of the core and which adheres to the core to seal the core, and the electric wiring lines are sealed with the cladding together with the core.

In the information recording and reproduction apparatus related to the present invention, light beam emitted from the light source are introduced into the core from one end side of the core and propagate toward the slider while repeating total reflection on the interface between the core and the cladding.

In addition, by sealing electric wiring lines within the cladding together with the core, they can be formed as a photoelectric composite wiring line in which the optical waveguide and electric wiring lines are integrally formed. In this case, since the core and the electric wiring lines can be collectively sealed within the cladding, it becomes possible to improve manufacturing efficiency and to reduce costs. In addition, it is also possible to reduce the size of the photoelectric composite wiring line by sealing the core and the electric wiring lines with the same cladding.

Moreover, the information recording and reproduction apparatus related to the present invention is characterized in that the core is disposed in approximately the middle on a cross section perpendicular to an extending direction of the cladding and the plurality of electric wiring lines is disposed so as to be symmetric with respect to the core.

In the information recording and reproduction apparatus related to the present invention, a plurality of electric wiring lines is distributed to both sides of the core by disposing the core in approximately the middle on the cross section of the cladding and disposing the electric wiring lines so as to be symmetric with respect to the core. Then, since the routing space of electric wiring lines can be ensured compared with the case where electric wiring lines are placed only at one side of the core, the layout efficiency between electric wiring lines can be improved. Accordingly, connection of the core and the electric wiring line to the slider becomes easy. In addition, since the force acting on the slider from the photoelectric composite wiring line becomes uniform, obstruction of the photoelectric composite wiring line in posture control of the slider can be prevented. Accordingly, there is little influence on the floating characteristic of the slider, tracking accuracy, and the like.

Moreover, the information recording and reproduction apparatus related to the present invention is characterized in that, in the core, the lengths of horizontal and vertical widths of a cross-sectional shape perpendicular to an extending direction of the core are set to be different.

In the information recording and reproduction apparatus related to the present invention, the oscillation plane of light beam emitted from the light source can be maintained in a fixed direction by setting the horizontal and vertical widths of the core differently. Accordingly, light beam can be guided to the slider while maintaining linear polarization.

Moreover, the information recording and reproduction apparatus related to the present invention is characterized in that a tunnel portion is formed in the cladding along an extending direction of the core.

In the information recording and reproduction apparatus related to the present invention, the oscillation plane of light beam emitted from the light source can be maintained in a fixed direction by disposing the tunnel portion in the cladding. Accordingly, light beam can be guided to the slider while maintaining linear polarization.

Moreover, the information recording and reproduction apparatus related to the present invention is characterized in that the optical waveguide has a stress applying portion for applying compressive stress in a direction perpendicular to an extending direction of the core.

In the information recording and reproduction apparatus related to the present invention, compressive stress acts on the core by disposing the stress applying portion. Since the compressive stress causes birefringence in the core, the oscillation plane of light beam can be maintained in a fixed direction. As a result, the light beam can be guided to the slider while maintaining linear polarization.

Moreover, the information recording and reproduction apparatus related to the present invention is characterized in that the stress applying portions are disposed so as to interpose both sides of the core.

In the information recording and reproduction apparatus related to the present invention, uniform compressive stress acts on the core by disposing the stress applying portions so as to interpose both sides of the core. As a result, it becomes easier to maintain linear polarization.

Moreover, the information recording and reproduction apparatus related to the present invention is characterized in that the stress applying portion is disposed on a surface of the cladding.

In the information recording and reproduction apparatus related to the present invention, uniform compressive stress acts on the core by disposing the stress applying portions so as to interpose both sides of the core. As a result, it becomes easier to maintain linear polarization.

In addition, since a simple configuration is adopted in which the stress applying portion is only disposed on the surface of the cladding, an increase in manufacturing efficiency can also be prevented.

Moreover, the information recording and reproduction apparatus related to the present invention is characterized in that the carriage includes a base portion, which is formed so as to be rotatable around the pivot shaft, and an arm portion, which is provided to extend from the base portion along a surface of the magnetic recording medium and the light source is disposed in the base portion.

In the information recording and reproduction apparatus related to the present invention, since light beam are supplied from the light source provided in the base portion of the carriage to the slider through the optical waveguide, a possibility that the heat generated from the light source when supplying light beam will be transmitted to the slider is very small. Accordingly, an influence of the heat generated from the light source can be suppressed. Accordingly, it is possible to prevent deformation of the slider caused by the influences of thermal expansion, warpage, and the like of the slider. In addition, the characteristic of the reproduction element of the slider can be maintained.

In addition, since the base portion of the carriage is configured so as to be rotatable around the pivot shaft, the arm portion is configured so as to be movable in a direction parallel to the surface of the magnetic recording medium with the pivot shaft as the center of rotation. At this time, by providing the light source in the base portion, the moment acting on the carriage at the time of movement of the slider is small compared with the case where the light source is mounted in the slider. Accordingly, the tracking accuracy can be maintained.

Moreover, the information recording and reproduction apparatus related to the present invention is characterized in that a terminal substrate which electrically connects the control unit and the slider to each other is provided in the base portion and the light source is disposed on the terminal substrate.

In the information recording and reproduction apparatus related to the present invention, since the terminal substrate serves as a relay point when electrically connecting the control unit and the slider to each other, electric wiring lines are routed to the slider with the terminal substrate as a base point. That is, since base ends of the optical waveguide and the electric wiring line are brought close to each other by disposing the light source on the terminal substrate, the photoelectric composite wiring line can be easily formed.

Moreover, the information recording and reproduction apparatus related to the present invention is characterized in that a suspension which is formed so as to be flexibly deformable in a thickness direction is supported at the tip of the arm portion, a gimbal means for supporting the slider in a state rotatable around two axes, which are parallel to the surface of the magnetic recording medium and are perpendicular to each other, and a flexibly deformable support, which extends from the gimbal means toward a base end of the suspension along the top of the suspension, are provided in the suspension, and the photoelectric composite wiring line is disposed on the support.

In the information recording and reproduction apparatus related to the present invention, the photoelectric composite wiring line is disposed on the flexibly deformable support. Accordingly, at the time of posture change of the slider, the photoelectric composite wiring line also deforms to follow the posture change of the support. As a result, disconnection of the photoelectric wiring line and the like can be prevented.

Moreover, the information recording and reproduction apparatus related to the present invention is characterized in that the photoelectric composite wiring line is disposed on the support with a base film, which has an insulation property, interposed.

In the information recording and reproduction apparatus related to the present invention, since the photoelectric composite wiring line is disposed on the support with the base film interposed, insulation between the support and the photoelectric composite wiring line can be ensured.

According to the information recording and reproduction apparatus related to the present invention, in order to improve manufacturing efficiency and reduce the manufacturing cost, a light source can be disposed to be spaced apart from a slider. As a result, an influence of heat generated from the light source can be suppressed.

DETAILED DESCRIPTION OF THE INVENTION (Information Recording and Reproduction Apparatus)

Figure 1:
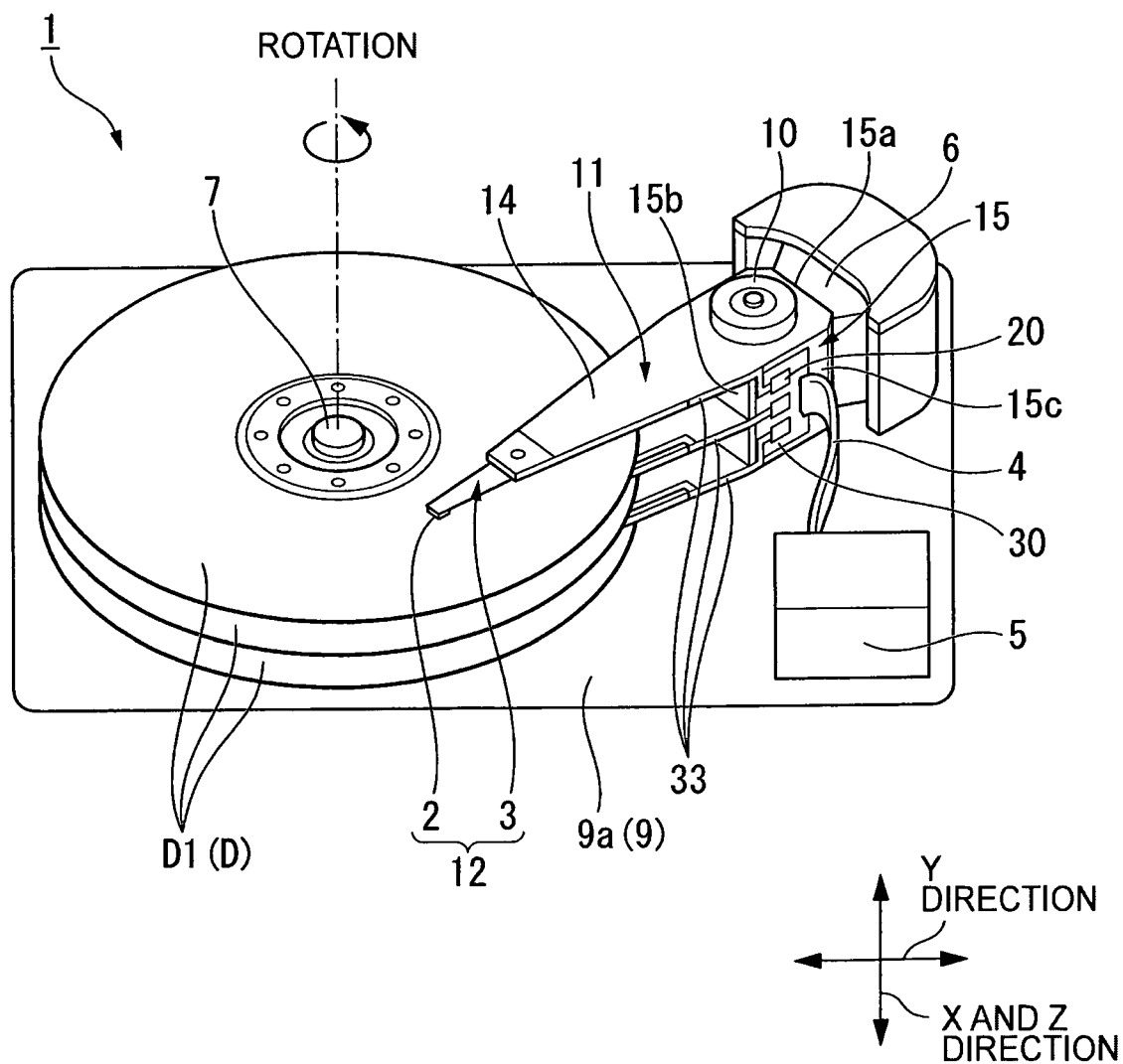
FIG. 1 is a view showing the configuration of an embodiment of an information recording and reproduction apparatus related to the present invention.

Hereinafter, an embodiment related to the present invention will be described with reference to FIGS. 1 to 7. FIG. 1 is a view showing the configuration of an embodiment of an information recording and reproduction apparatus 1 related to the present invention. In addition, the information recording and reproduction apparatus 1 of the present embodiment is an apparatus which performs writing on a disk (magnetic recording medium) D, which has a perpendicular recording layer, by a perpendicular recording method.

As shown in FIG. 1, the information recording and reproduction apparatus 1 of the present embodiment includes: a carriage 11; a laser light source 20 which supplies light beam from the base end side of the carriage 11 through a photoelectric composite wiring line 33; a head gimbal assembly (HGA) 12 supported on the distal side of the carriage 11; an actuator 6 which makes the head gimbal assembly 12 perform scan movement in the XY direction parallel to a disk surface D1 (surface of a disk D); a spindle motor 7 which rotates the disk D in a predetermined direction; a control unit 5 which supplies a current, which is modulated according to the information, to a slider 2 of the head gimbal assembly 12; and a housing 9 in which these respective constituent components are housed.

The housing 9 is formed of a metal material, such as aluminum, has a box shape with an upper opening, and is configured to include a bottom portion 9a with a rectangular shape when viewed from above and a peripheral wall (not shown) provided in a direction perpendicular to the bottom portion 9a in the peripheral edge of the bottom portion 9a. In addition, a recess in which each of the constituent components described above is housed is formed at the inside surrounded by the peripheral wall. Moreover, in FIG. 1, the peripheral wall which surrounds the periphery of the housing 9 is omitted for easy understanding of the explanation.

In addition, a lid (not shown) is detachably fixed to the housing 9 so as to cover the opening of the housing 9. The spindle motor 7 is fixed to the approximately middle of the bottom portion 9a, and the disk D is detachably fixed by inserting a center hole into the spindle motor 7.

The actuator 6 is fixed at the outer side of the disk D, that is, in the corner of the bottom portion 9a. The carriage 11 which is rotatable in the XY direction around a pivot shaft 10 is fixed to the actuator 6.

The carriage 11 is obtained by integrally forming an arm portion 14, which is provided to extend from the base end toward the distal end along the disk surface D1, and a base portion 15, which supports the arm portion 14 through the base end like a cantilever, by cutting processing or the like.

The base portion 15 is formed in a rectangular parallelepiped shape and is supported so as to be able to rotate around the pivot shaft 10. That is, the base portion 15 is connected to the actuator 6 through the pivot shaft 10, and the pivot shaft 10 is the center of rotation of the carriage 11.

The arm portion 14 has a plate shape extending in parallel to the surface direction (XY direction) of the upper surface of the base portion 15 on a side surface (side surface opposite a corner) 15b of the base portion 15 opposite a side surface 15a to which the actuator 6 is fixed, and three arm portions 14 extend along the height direction (Z direction) of the base portion 15. Specifically, the arm portion 14 is formed in a tapered shape which tapers from the base end toward the distal end, and is disposed so that the disk D is inserted between the respective arm portions 14. That is, the arm portion 14 and the disk D are alternately disposed, and the arm portion 14 is made to be movable in a direction (XY direction) parallel to the surface of the disk D by driving of the actuator 6. In addition, the carriage 11 and the head gimbal assembly 12 move back from over the disk D by driving of the actuator 6 at the stop of rotation of the disk D.

The head gimbal assembly 12 generates near-field light (spot light) by guiding light beam from the laser light source 20 to the slider 2, which is a near-field light head having a near-field light generating element (spot light generating element; not shown), and records and reproduces various kinds of information on and from the disk D using the near-field light. In addition, the near-field light generating element is formed by an optically fine aperture, a protruding portion formed in a nanometer size, and the like, for example.

Figure 2:
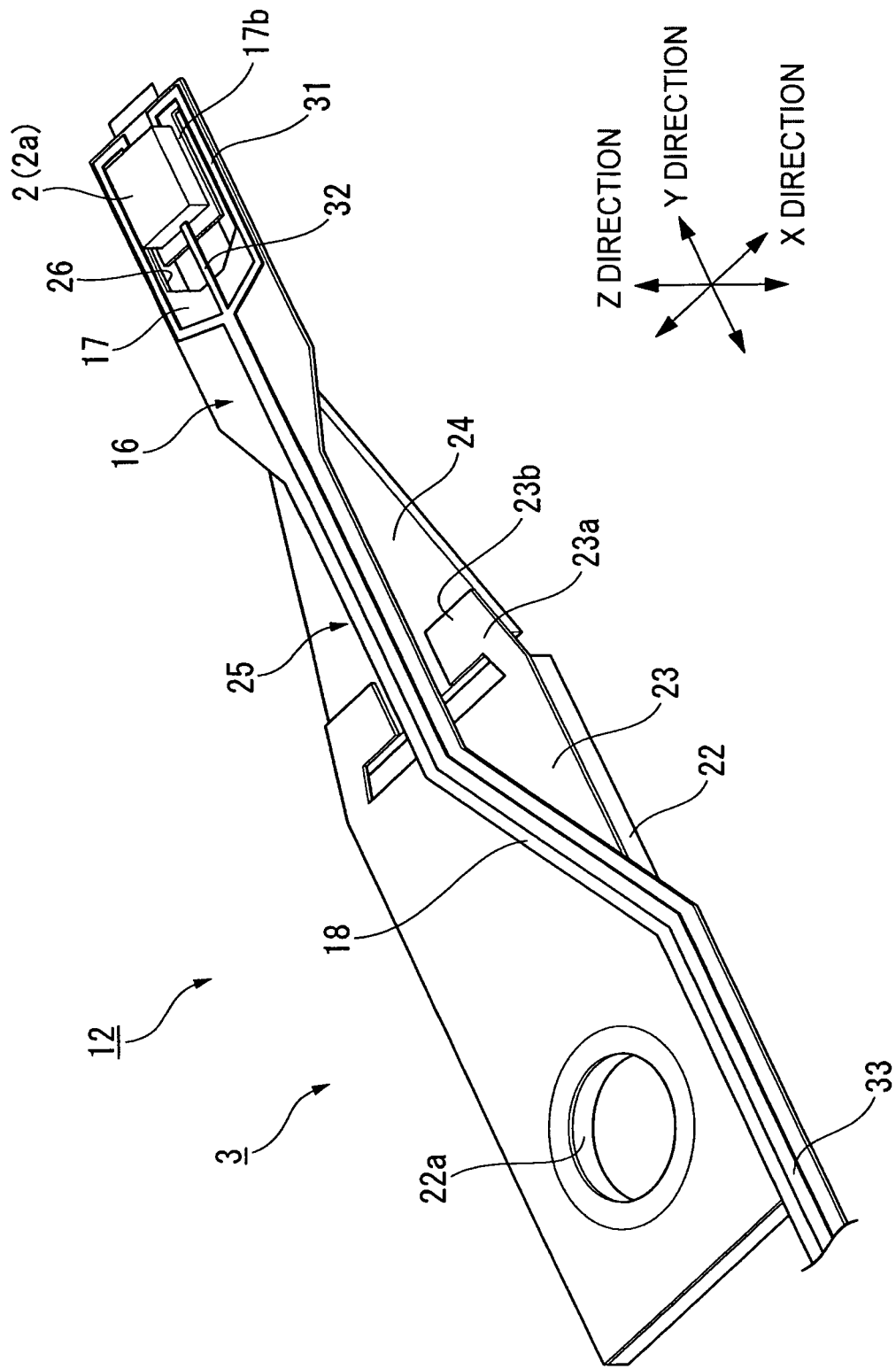
FIG. 2 is a perspective view of a head gimbal assembly shown in FIG. 1.
Figure 3:
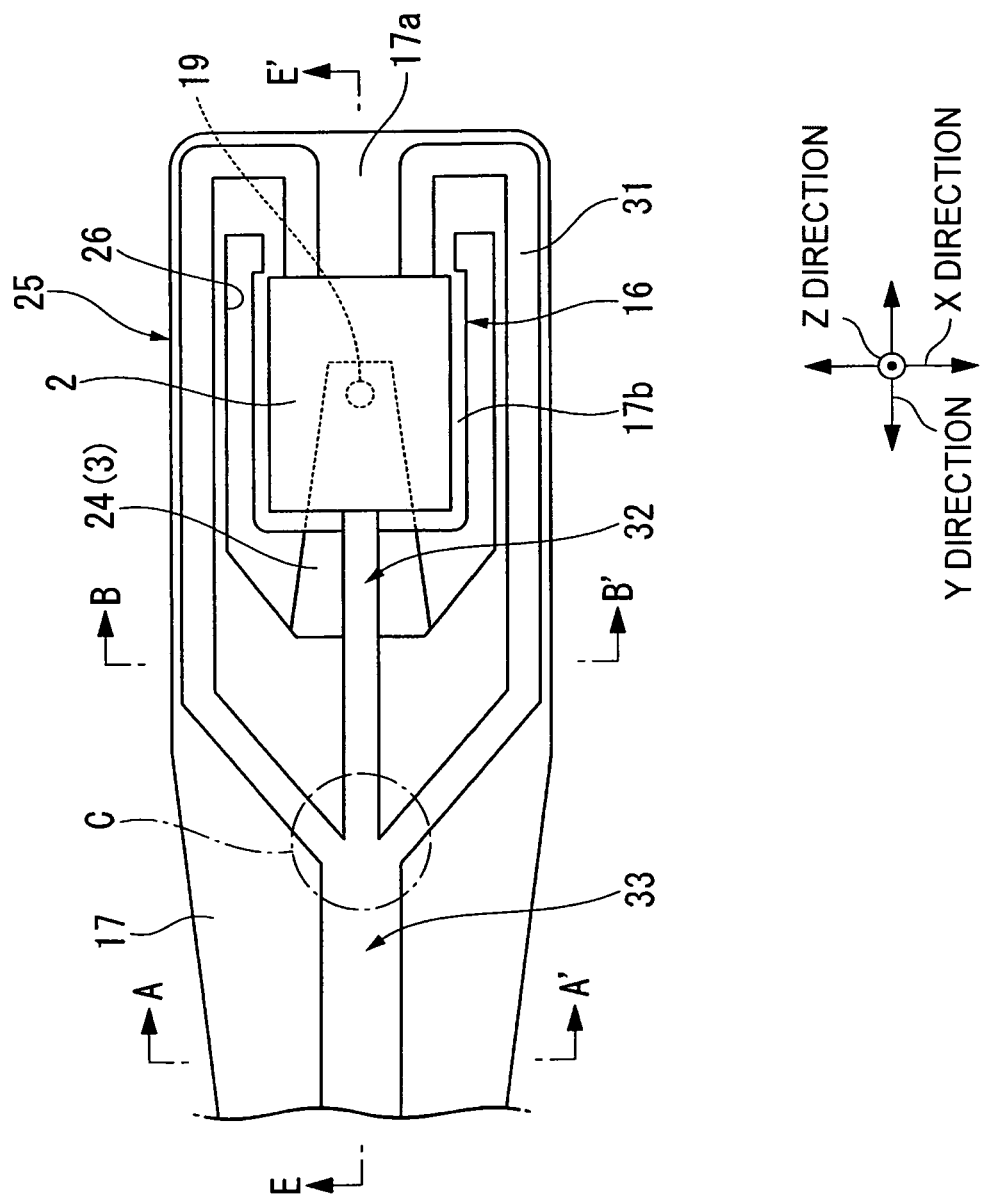
FIG. 3 is a plan view of a gimbal shown in FIG. 2.
Figure 4:
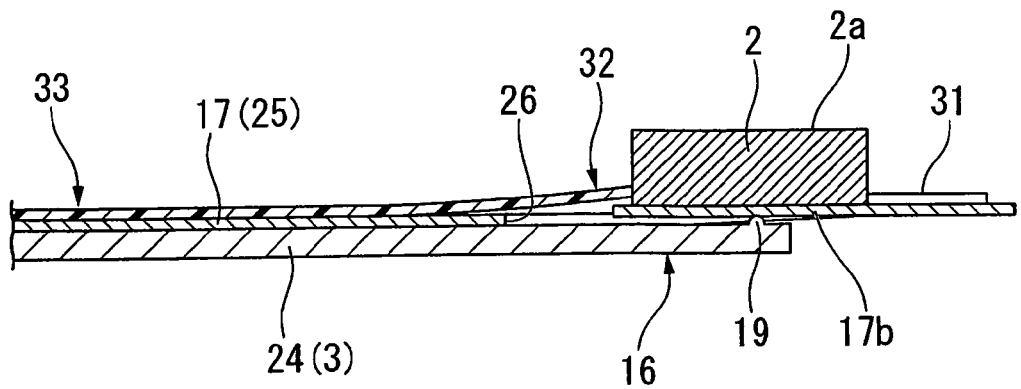
FIG. 4 is a cross-sectional view taken along the line E-E' of FIG. 3.
Figure 4:
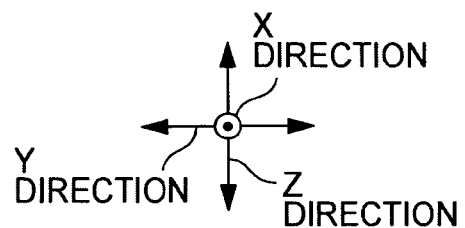

FIG. 2 is a perspective view when a suspension 3 is viewed from the slider 2 side in a state where the slider 2 is in the upward direction. FIG. 3 is a plan view when a gimbal 17 is viewed in a state where the slider 2 is in the upward direction. FIG. 4 is a cross-sectional view taken along the line E-E' of FIG. 3, and is a sectional view of the tip of the suspension 3 in a state where the slider 2 is in the upward direction.

As shown in FIGS. 2 to 4, the head gimbal assembly 12 of the present embodiment functions as a suspension, which makes the slider 2 float from the disk D, and includes the slider 2, the suspension 3 which is formed in a thin plate shape by a metal material and is movable in the XY direction parallel to the disk surface D1, and a gimbal means 16 for fixing the slider 2 to the bottom surface of the suspension 3 in a state rotatable around two axes (X and Y axes) which are parallel to the disk surface D1 and are perpendicular to each other, that is, so as to be able to be twisted around the two axes.

First, the slider 2 is supported on the bottom surface of the suspension 3 with the gimbal 17, which will be described later, interposed in a state disposed between the disk D and the suspension 3. The slider 2 includes a reproduction element (not shown), which is fixed to the distal side, and a recording element (not shown), which is fixed adjacent to the reproduction element. In addition, the slider 2 has a condensing lens (optical system; not shown), which is provided at the opposite side of the reproduction element with the recording element interposed and which condenses light beam emitted from the laser light source 20, and the near-field light generating element which generates near-field light from the light beam condensed by the condensing lens. That is, in the slider 2, a reproduction element, a recording element, and a near-field light generating element are located in a line at the distal end.

In addition, the bottom surface of the slider 2 is a floating surface 2a facing the disk surface D1. The floating surface 2a is a surface which generates pressure for floating by the viscosity of airflow generated by the rotating disk D, and is called an ABS (Air Bearing Surface). Specifically, it is designed such that the slider 2 floats in the optimal state by adjusting positive pressure, which separates the slider 2 from the disk surface D1, and negative pressure, which pulls the slider 2 to the disk surface D1.

The slider 2 receives a force floating from the disk surface D1 by the floating surface 2a and also receives a force pressed toward the disk D by the suspension 3. In addition, the slider 2 floats from the disk surface D1 by the balance of both the forces.

The suspension 3 is formed by a base plate 22, which is formed in an approximately rectangular shape when viewed from above, and a load beam 24, which is connected to the distal side of the base plate 22 through a hinge plate 23 and has an approximately triangular shape when viewed from above.

The base plate 22 is formed of a metal material with a thin thickness, such as stainless steel, and an opening 22a passing through in the thickness direction is formed at the base end side. In addition, the base plate 22 is fixed to the tip of the arm portion 14 through the opening 22a. The hinge plate 23 with a sheet shape formed of a metal material, such as stainless steel, is disposed on the bottom surface of the base plate 22. The hinge plate 23 has a plate shape formed on the entire bottom surface of the base plate 22, and the distal end is formed as an extending portion 23a which extends from the tip of the base plate 22 along the longitudinal direction of the base plate 22. Two extending portions 23a extend from both ends of the hinge plate 23 in the width direction, and enlarged portions 23b whose widths expand to the inner side in the width direction, that is, in a direction facing the extending portions 23a are formed at the distal ends. The load beam 24 is connected to the upper surface of the enlarged portion 23b.

The load beam 24 is formed by a metal material with a thin thickness, such as stainless steel, similar to the base plate 22 and is connected to the hinge plate 23 with a gap between the base end and the tip of the base plate 22. Accordingly, the suspension 3 is bent between the base plate 22 and the load beam 24, and bends easily toward a Z direction perpendicular to the disk surface D1.

A flexure 25 is provided on the suspension 3. The flexure 25 has a sheet shape formed of a metal material, such as stainless steel, and is formed so as to be flexibly deformable in the thickness direction due to being formed in the sheet shape. The flexure 25 is formed by the gimbal 17, which is fixed to the distal side of the load beam 24 and has an appearance formed in an approximately pentagon shape when viewed from above, and a support 18, which is formed to have a narrower width than the gimbal 17 and extends from the base end of the gimbal 17 along the top of the suspension 3.

As shown in FIGS. 3 and 4, from the vicinity of the middle to the tip, the gimbal 17 is formed so as to be slightly warped in the thickness direction toward the disk surface D1. In addition, the gimbal 17 is fixed to the load beam 24 from the base end side to the approximate middle so that the warped distal side is not in contact with the load beam 24.

In addition, a notched portion 26 with the periphery bored in a U shape is formed at the distal side of the gimbal 17 in the floating state, and a pad portion (tongue piece portion) 17b supported like a cantilever by a connecting portion 17a is formed in a portion surrounded by the notched portion 26. That is, the pad portion 17b is formed to overhang from the distal side of the gimbal 17 toward the base end side by the connecting portion 17a and has the notched portion 26 around. Accordingly, since the pad portion 17b is easily bent in the thickness direction of the gimbal 17, only the pad portion 17b is angle-adjusted so as to be parallel to the bottom surface of the suspension 3. In addition, the slider 2 is placed and fixed on the pad portion 17b. That is, the slider 2 is in a state hanging on the load beam 24 with the pad portion 17b interposed.

In addition, a protruding portion 19 which protrudes toward the approximate middle of the pad portion 17b and the slider 2 is formed at the tip of the load beam 24. The tip of the protruding portion 19 is rounded. In addition, the protruding portion 19 is in point contact with the surface (upper surface) of the pad portion 17b when the slider 2 floats to the load beam 24 side by air pressure received from the disk D. This floating force is transmitted from the protruding portion 19 to the load beam 24 and acts to bend the hinge plate 23. In addition, when air pressure in the XY direction is applied to the slider 2 by the undulation of the disk D or the like, the slider 2 and the pad portion 17b are twisted around two axes of X and Y axes with the protruding portion 19 as the center. Accordingly, since displacement in the Z direction (displacement in a direction approximately perpendicular to the disk surface D1) caused by the undulation of the disk D can be absorbed, the posture of the slider 2 is stabilized. In addition, the protruding portion 19 and the gimbal 17 having the pad portion 17b form the gimbal means 16.

The support 18 shown in FIG. 2 has a sheet shape integrally formed in the gimbal 17 and is provided to extend toward the arm portion 14 on the suspension 3. That is, the support 18 is formed to follow deformation of the suspension 3 when the suspension 3 deforms. The support 18 turns to the side surface from the top of the arm portion 14 to be routed until it reaches the base portion 15 of the arm portion 14.

Figure 5:
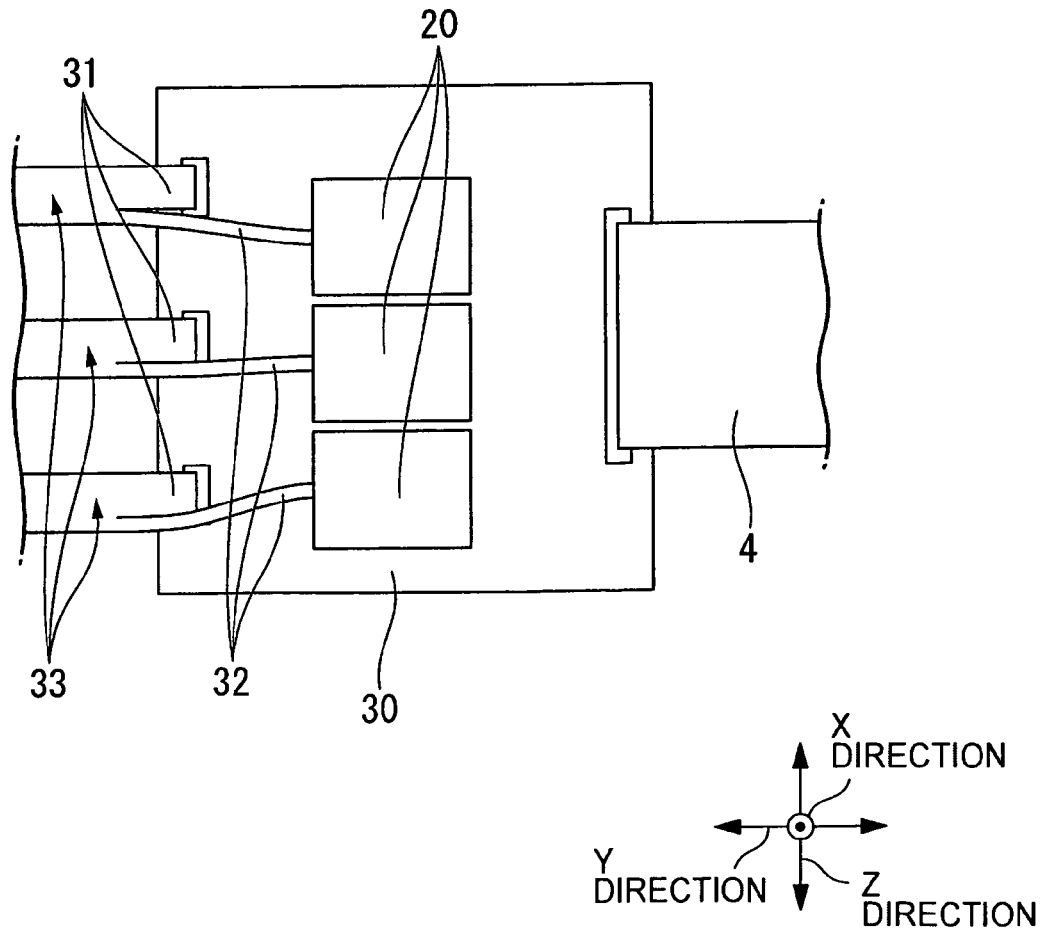
FIG. 5 is a plan view of a terminal substrate shown in FIG. 1.

FIG. 5 is a plan view of a terminal substrate 30 fixed to the base portion 15 of the carriage 11.

As shown in FIGS. 1 and 5, the terminal substrate 30 is disposed on a side surface 15c in the base portion 15 of the carriage 11. The terminal substrate 30 serves as a relay point when electrically connecting the control unit 5 and the slider 2 provided in the housing 9, and various control circuits (not shown) are formed on the surface. While the control unit 5 and the terminal substrate 30 are electrically connected by a flexible flat cable 4, the terminal substrate 30 and the slider 2 are connected by an electric wiring line 31. Three sets of electric wiring lines 31 are provided corresponding to the number of sliders 2 provided for each carriage 11, such that a signal output from the control unit 5 through the flat cable 4 is output to the slider 2 through the electric wiring lines 31.

In addition, the laser light source 20 which supplies light beam toward the condensing lens of the slider 2 is disposed on the terminal substrate 30. The laser light source 20 receives a signal output from the control unit 5 through the flat cable 4 and emits light beam on the basis of the signal. Three laser light sources 20 are disposed along the height direction (Z direction) of the base portion 15 corresponding to the number of sliders 2 provided in each arm portion 14. An optical waveguide 32 which guides a light beam emitted from each laser light source 20 to the condensing lens of the slider 2 is connected to the emission side of each laser light source 20.

Figure 6:
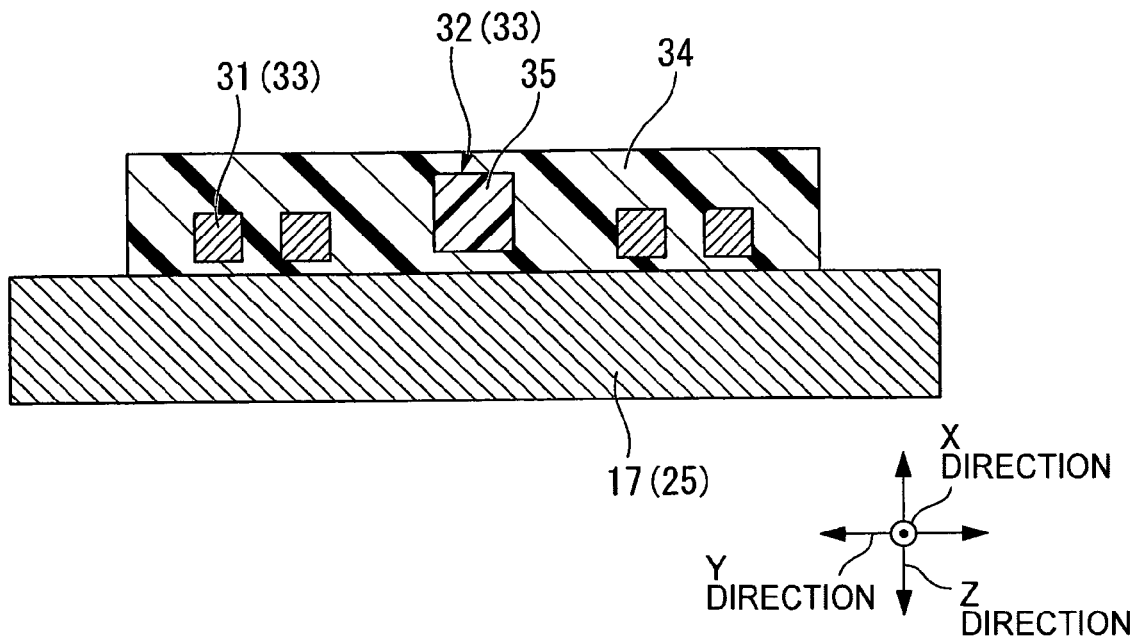
FIG. 6 is a cross-sectional view taken along the line A-A' of FIG. 3.
Figure 7:
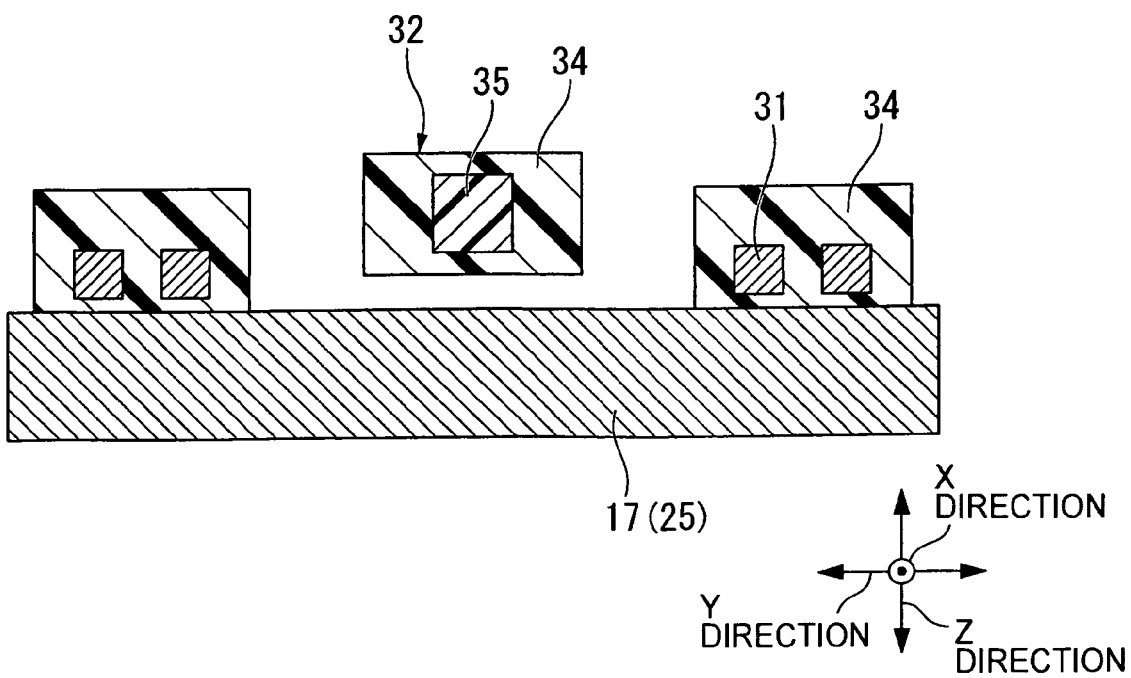
FIG. 7 is a cross-sectional view taken along the line B-B' of FIG. 3.

FIG. 6 is a cross-sectional view taken along the line A-A' of FIG. 3, and FIG. 7 is a cross-sectional view taken along the line B-B' of FIG. 3.

As shown in FIGS. 3 and 5 to 7, between the laser light source 20 and the slider 2, one optical waveguide 32 and one set of electric wiring lines 31 corresponding to each slider 2 are formed as the photoelectric composite wiring line 33 which is integrally formed from the base end side to the distal end. The photoelectric composite wiring line 33 is routed from the surface of the terminal substrate 30 onto the arm portion 14 while passing the side surface of the arm portion 14. Specifically, the photoelectric composite wiring line 33 is disposed on the above-described support 18 (refer to FIG. 2) of the flexure 25 on the arm portion 14 and the suspension 3, and is routed to the tip of the suspension 3 with the support 18 interposed. Thus, the photoelectric composite wiring line 33 is formed on the support 18 which is flexibly deformable. Accordingly, when the slider 2 moves or the suspension 3 deforms, the photoelectric composite wiring line 33 deforms to follow it together with the support 18. Accordingly, disconnection of the photoelectric composite wiring line 33 and the like can be prevented.

The optical waveguide 32 which forms the photoelectric composite wiring line 33 has a core 35, which is formed in a thickness of 3 to 10 μm, for example, and which guides light beam emitted from the laser light source 20 in a total reflection condition, and a cladding 34, which is formed in a thickness of tens of micrometers, for example, which is formed of a material with a refractive index lower than the refractive index of the core 35, and which adheres to the core 35 to seal the core 35. In addition, light beam emitted from the laser light source 20 are guided to the condensing lens of the slider 2 in the total reflection condition due to the difference between the refractive indices of the core 35 and the cladding 34.

In addition, if an example of the combination of materials used as the cladding 34 and the core 35 is described, a combination may be considered in which the core 35 is formed in a thickness of 3 to 10 μm, for example, by PMMA (polymethyl methacrylate) and the cladding 34 is formed in a thickness of tens of micrometers by a fluorine-containing polymer. In addition, both the core 35 and the cladding 34 may be formed of epoxy resin (for example, the refractive index of the core is 1.522 to 1.523, and the refractive index of the cladding is 1.518 to 1.519) or may be formed of fluorinated polyimide. In addition, since the force which traps light beam in the core 35 increases as the difference between the refractive indices of the core 35 and the cladding 34 increases, it is preferable to increase the difference between the refractive indices by adjusting the mixing of resin materials which form the core 35 and the cladding 34. For example, in the case of fluorinated polyimide, the refractive indices can be controlled by adjusting the fluorine content or by energy irradiation of emitted light or the like.

In addition, the electric wiring line 31 is formed of aluminum, copper, or the like and is confined in the cladding 34 together with the core 35.

By using a resin material as a constituent material of the optical waveguide 32 of the photoelectric composite wiring line 33, the photoelectric composite wiring line 33 can be manufactured according to a semiconductor process.

A method of manufacturing the photoelectric composite wiring line 33 of the present embodiment using a semiconductor process will be described more specifically. First, a constituent material of the cladding 34 is applied on the support 18 and is then patterned by a photolithography technique or the like. Then, a constituent material of the electric wiring line 31 is formed as a film on the cladding 34 by a sputtering method, a CVD method, or the like and is patterned as the plurality of electric wiring lines 31. Then, a constituent material of the core 35 is applied between the electric wiring lines 31, that is, in the middle of the cladding 34 on the YZ plane and is then patterned, and a constituent material of the cladding 34 is applied again. Then, the photoelectric composite wiring line 33 of the present embodiment can be formed by patterning.

Thus, by integrally forming the optical waveguide 32 and the electric wiring line 31 by the cladding 34 formed of a resin material, these can be collectively formed according to the semiconductor process. Moreover, since the photoelectric composite wiring line 33 is manufactured using the semiconductor process, manufacturing efficiency can be improved through the easiness of mass production, compared with the case where the optical waveguide 32 and the electric wiring line 31 are separately formed. Accordingly, the processing accuracy can be improved. In addition, manufacturing costs can be reduced.

As shown in FIGS. 6 and 7, in the photoelectric composite wiring line 33, the core 35 of the optical waveguide 32 is disposed in the middle of the cladding 34 in the width direction (YZ plane) in sectional view, and two electric wiring lines 31 are disposed at each of both sides of the optical waveguide 32 so as to interpose the optical waveguide 32. That is, the photoelectric composite wiring line 33 is formed so as to be symmetric with respect to the core 35. Thus, since both the core 35 and the electric wiring line 31 are sealed with the cladding 34, they are formed as the photoelectric composite wiring line 33 in which the optical waveguide 32 and the electric wiring line 31 are integrally formed.

Moreover, as shown in FIG. 3, the photoelectric composite wiring line 33 branches off to the electric wiring line 31 and the optical waveguide 32 at the tip of the suspension 3, specifically, at the middle position of the gimbal 17. The radius of curvature of the optical waveguide 32 from this branch point C to the slider 2 is larger than the radius of curvature of the electric wiring line 31.

Specifically, the optical waveguide 32 extends along the longitudinal direction of the gimbal 17 from the branch point C at the distal side of the photoelectric composite wiring line 33 and is directly connected to the base end side of the slider 2 across the notched portion 26 of the gimbal 17. The optical waveguide 32 is separated from the bottom surface of the gimbal 17 at the branch point C of the photoelectric composite wiring line 33, and extends in a slightly floating state from the branch point C toward the base end side of the slider 2 so as to be stretched over between the pad portion 17b and the gimbal 17. That is, on the bottom surface of the gimbal 17, the optical waveguide 32 is routed to the base end surface side of the slider 2 in a state extending approximately linearly (radius of curvature is approximately infinite). The optical waveguide 32 routed to the base end surface side of the slider 2 is connected to the near-field light generating element, which is provided at the distal surface side of the slider 2, through the condensing lens in the slider 2.

On the other hand, at the branch point C, the electric wiring line 31 is bent toward a peripheral portion of the gimbal 17 and is routed from the peripheral portion of the gimbal 17, that is, from the outside of the notched portion 26. In addition, the electric wiring line 31 routed from the outside of the notched portion 26 is connected to the distal surface side of the slider 2 through the connecting portion 17a. That is, the electric wiring line 31 is directly connected, from the outside of the slider 2, to the reproduction element or the recording element provided at the distal surface side of the slider 2.

Next, procedures of recording and reproducing various kinds of information on and from the disk D using the information recording and reproduction apparatus 1 configured as described above will be described below.

First, the spindle motor 7 is driven to rotate the disk D in a predetermined direction. Then, the actuator 6 is operated to rotate the carriage 11 around the pivot shaft 10 as the center of rotation and the head gimbal assembly 12 performs scanning in the XY direction through the carriage 11. Thus, the slider 2 can be located at the desired position on the disk D.

Here, since the base portion 15 of the carriage 11 is configured so as to be rotatable around the pivot shaft 10, the arm portion 14 moves in a direction parallel to the disk surface D1 with the pivot shaft 10 as the center of rotation. At this time, since the laser light source 20 is provided on the terminal substrate 30 of the base portion 15, the moment acting on the carriage 11 at the time of movement of the slider 2 is small compared with the case where the laser light source 20 is mounted in the slider 2. Accordingly, the tracking accuracy can be maintained. In addition, since the terminal substrate 30 serves as a relay point when electrically connecting the control unit 5 and the slider 2 to each other, the electric wiring line 31 is routed to the slider 2 with the terminal substrate 30 as a base point. That is, since base ends of the optical waveguide 32 and the electric wiring line 31 are brought close to each other by disposing the laser light source 20 on the terminal substrate 30, the photoelectric composite wiring line 33 can be easily formed.

Subsequently, light beams from the laser light source 20 are incident on the optical waveguide 32 (photoelectric composite wiring line 33) and are then guided to the slider 2. In the information recording and reproduction apparatus 1 of the present embodiment, the laser light source 20 which supplies light beams to the condensing lens of the slider 2 is provided on the terminal substrate 30 in the base portion 15 of the slider 2. In this case, light beams emitted from the laser light source 20 are introduced into the core 35 from one end side of the core 35 in the photoelectric composite wiring line 33 and propagate toward the slider 2 while repeating total reflection on the interface between the core 35 and the cladding 34. At this time, the light beams having propagated through the core 35 are condensed by the condensing lens within the slider 2, and the spot size narrows gradually. Accordingly, near-field light is generated around the near-field light generating element so as to leak out. In addition, since the core 35 is sealed in a state where the cladding 34 adheres thereto, a propagating light beam does not leak to the outside of the core 35 on the way. Consequently, the introduced light beam can be efficiently used as near-field light without light being lost.

In addition, the disk D on which near-field light has been incident is locally heated by the near-field light and the coercivity is temporarily reduced. On the other hand, if a current is supplied to the recording element of the slider 2 by the control unit 5, a recording magnetic field in a direction perpendicular to the disk D can be generated by the principle of an electromagnet. As a result, the information can be recorded by the hybrid magnetic recording method in which near-field light and the recording magnetic field generated in the recording element are made to cooperate with each other.

On the other hand, when reproducing the information recorded on the disk D, the reproduction element which is fixed adjacent to the recording element receives a magnetic field leaking from the disk D and the electric resistance changes according to its size. Accordingly, the voltage of the reproduction element changes. Then, the control unit 5 can detect the change in the magnetic field leaking from the disk D as a voltage change. In addition, the control unit 5 can reproduce the information by reproducing a signal from the voltage change.

Thus, various kinds of information can be recorded and reproduced on and from the disk D using the slider 2.

Here, the slider 2 is supported by the suspension 3 and is also pressed toward the disk D by the predetermined force. Moreover, at the same time, since the floating surface 2a faces the disk D, the slider 2 receives a floating force by an influence of air pressure caused by the rotating disk D. By the balance of both the forces, the slider 2 floats to the position spaced apart from the disk D.

In this case, since the slider 2 is pressed toward the suspension 3 by the air pressure, the pad portion 17b of the gimbal 17 which fixes the slider 2 and the protruding portion 19 formed in the suspension 3 are in point contact with each other. In addition, the floating force is transmitted to the suspension 3 through the protruding portion 19, and it acts to bend the suspension 3 in a Z direction perpendicular to the disk surface D1. As a result, the slider 2 floats as described above. In addition, since the base plate 22 and the load beam 24 are connected to the suspension 3 through the hinge plate 23, it can be easily bent between the base plate 22 and the load beam 24.

Moreover, even if the slider 2 receives air pressure (air pressure in the XY direction) caused by the undulation of the disk D, it is twisted around the X and Y axes through the gimbal means 16, that is, through the pad portion 17b which is in point contact with the tip of the protruding portion 19.

Accordingly, since displacement in the Z direction caused by the undulation can be absorbed, the posture of the slider 2 when it floats can be stabilized.

Thus, in the information recording and reproduction apparatus 1 of the present embodiment, the optical waveguide 32 and the electric wiring line 31 are provided and the optical waveguide 32 and the electric wiring line 31 are integrally formed as the photoelectric composite wiring line 33 by sealing the electric wiring line 31 in the cladding 34 together with the core 35 between the laser light source 20 and the slider 2.

According to this configuration, since the optical waveguide 32 and the electric wiring line 31 are integrally formed as the photoelectric composite wiring line 33, the optical waveguide 32 and the electric wiring line 31 can be simultaneously fixed. Accordingly, a lowering in manufacturing efficiency can be prevented. That is, even when the laser light source 20 is disposed at a position distant from the slider 2, the photoelectric composite wiring line 33 can be easily routed to the slider 2.

In addition, since the optical waveguide 32 and the electric wiring line 31 are integrally formed, it is not necessary to take into consideration the layout in the routing of each wiring line unlike the related art, and the degree of freedom in fixing the photoelectric composite wiring line 33 can be improved. Therefore, since the layout efficiency of the photoelectric composite wiring line 33 can be improved, the photoelectric composite wiring line 33 can be easily routed to the slider 2 even when the laser light source 20 is disposed at a position distant from the slider 2, as described above, on the terminal substrate 30.

In this case, since it becomes possible to dispose the laser light source 20 so as to be spaced apart from the slider 2, a possibility that the heat generated from the laser light source 20 when a light beam is supplied will be transmitted up to the slider 2 is very small. Accordingly, an influence of the heat generated from the laser light source 20 can be suppressed. Therefore, it is possible to prevent deformation of the slider 2 caused by the influences of thermal expansion, warpage, and the like of the slider 2. In addition, the characteristic of the reproduction element of the slider 2 can be maintained.

Meanwhile, when the laser light source 20 is disposed in the control unit 5, an optical waveguide is provided in the flat cable 4. If the flat cable 4 is bent to deform, there is a problem that the guiding loss of light is increased. In the present embodiment, it is not necessary to provide an optical waveguide in the flat cable 4 because the laser light source 20 is provided in the base portion 15 of the carriage 11. Accordingly, the guiding loss of light can be suppressed.

Moreover, in the present embodiment, since the layout efficiency of the photoelectric composite wiring line 33 can be improved as described above, bending of the photoelectric composite wiring line 33 is small. As a result, since the guiding loss of light beam passing through the optical waveguide 32 of the photoelectric composite wiring line 33 can be reduced, the light propagation efficiency can be maintained.

Here, since the core 35 and the electric wiring line 31 are sealed with the same cladding 34, a distance between the core 35 and the electric wiring line 31 or a distance between the electric wiring lines 31 can be reduced compared with the case where the optical waveguide 32 and the electric wiring lines 31 are separately formed. In addition, since it is not necessary to cover an insulating material or the like for each electric wiring line 31, the photoelectric composite wiring line 33 can be made small and light. Moreover, since the insulation between the electric wiring lines 31 can be ensured by the cladding 34, routing of each electric wiring line 31 becomes easy.

In addition, by disposing the core 35 in the approximately middle on the cross section of the cladding 34 and disposing the electric wiring lines 31 so as to be symmetric with respect to the core 35, the plurality of electric wiring lines 31 is distributed at both sides of the core 35. Then, since the routing space of the electric wiring lines 31 can be ensured, the layout efficiency between the electric wiring lines 31 can be improved compared with the case where the electric wiring lines 31 are placed at only one side of the core 35. Accordingly, connection of the core 35 and the electric wiring line 31 to the slider 2 becomes easy. In addition, the force acting on the slider 2 from the photoelectric composite wiring line 33 becomes uniform.

Therefore, since obstruction of the photoelectric composite wiring lines 33 in posture control of the slider 2 can be prevented, there is little influence on the floating characteristic of the slider 2, tracking accuracy, and the like.

In addition, the technical scope of the present invention is not limited to the embodiment described above, but those obtained by modifying the above-described embodiment in various ways without departing from the spirit and scope of the present invention are also included. That is, the configuration and the like mentioned in the above embodiment are no more than examples and may be appropriately changed.

Figure 8:
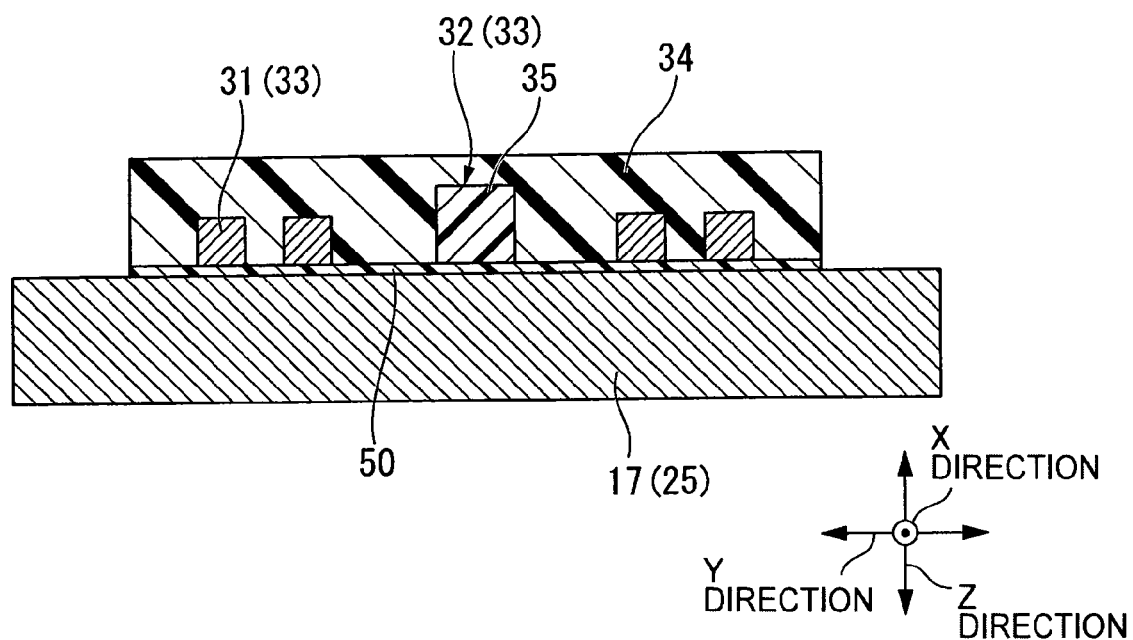
FIG. 8 is a cross-sectional view equivalent to the line A-A' of FIG. 3 which shows another embodiment of the information recording and reproduction apparatus related to the present invention.

For example, as shown in FIG. 8, a configuration is also possible in which a base film 50 is provided between the photoelectric composite wiring line 33 and the flexure 25. The base film 50 is formed of an insulating material, such as polyimide. In this case, insulation between the electric wiring lines 31 and the flexure 25 can be more reliably ensured.

Figure 9:
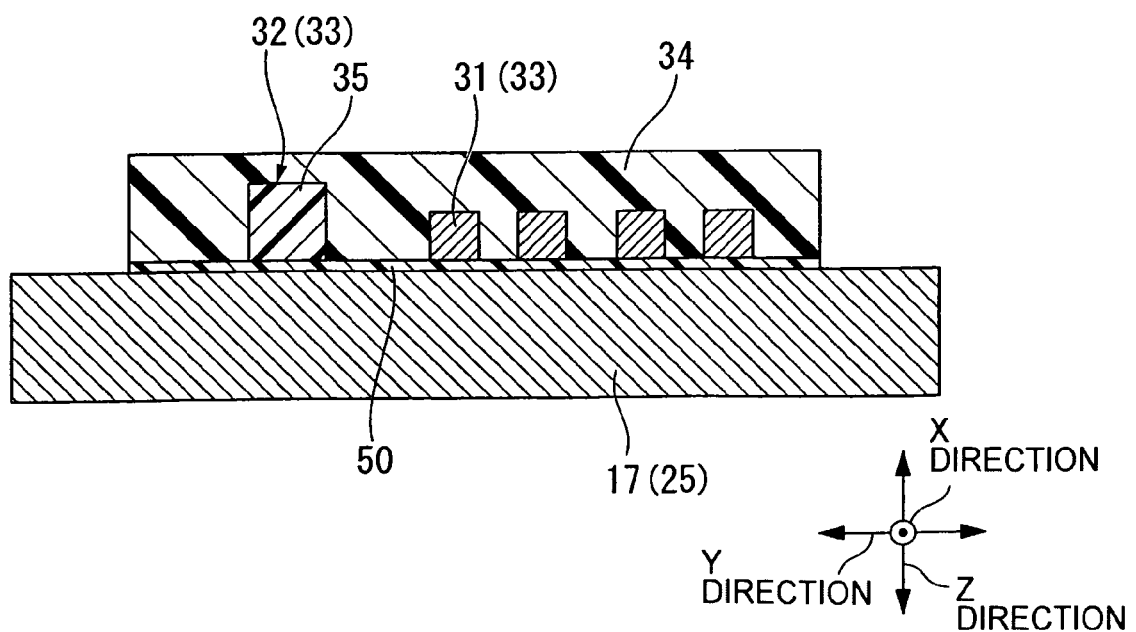
FIG. 9 is a cross-sectional view equivalent to the line A-A' of FIG. 3 which shows still another embodiment of the information recording and reproduction apparatus related to the present invention.

Moreover, in the above embodiment, the case was described in which the electric wiring lines 31 were disposed so as to be symmetric with respect to the optical waveguide 32, as shown in FIG. 6. However, layout design of the electric wiring lines 31 and the optical waveguide 32 may be appropriately changed. For example, as shown in FIG. 9, the optical waveguide 32 and the electric wiring lines 31 may be disposed so as to be located in a line in order from one end side of the cladding 34 in the width direction (YZ plane).

Moreover, in the above embodiment, the configuration was described in which the optical waveguide 32 and the electric wiring lines 31 were sealed with the cladding 34 of the same material, as shown in FIG. 6. However, the core 35 and the electric wiring lines 31 may be sealed with different constituent materials as long as the optical waveguide 32 and the electric wiring lines 31 are integrally formed.

Figure 10:
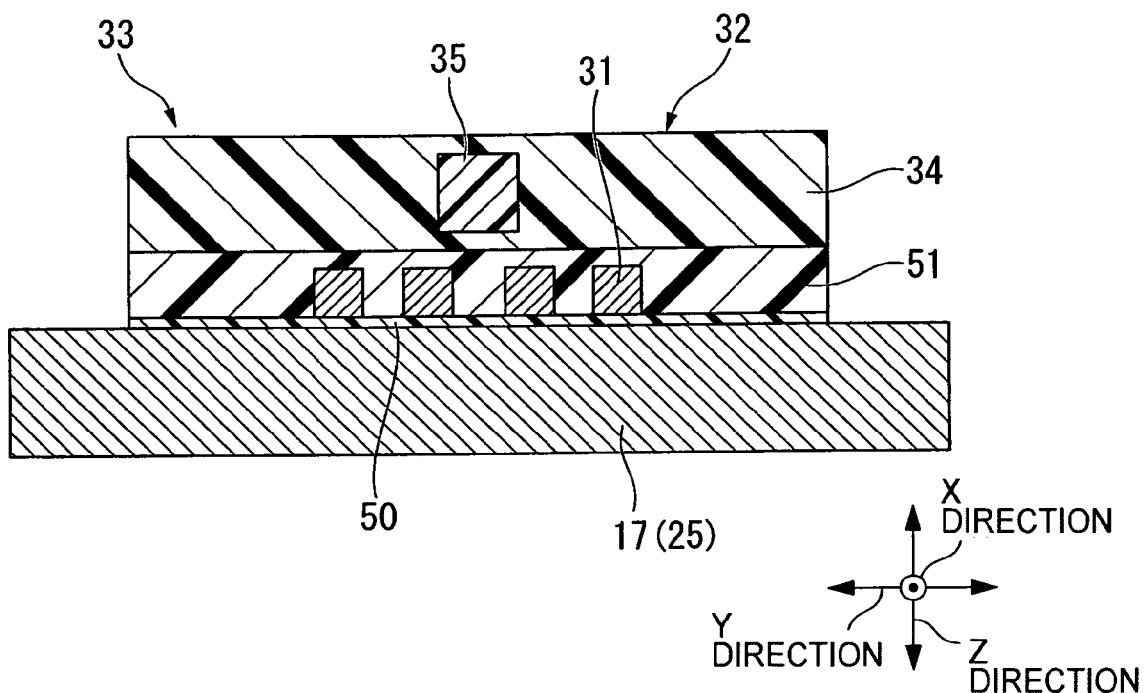
FIG. 10 is a cross-sectional view equivalent to the line A-A' of FIG. 3 which shows still another embodiment of the information recording and reproduction apparatus related to the present invention.

Specifically, the electric wiring lines 31 are first formed on the flexure 25 with the base film 50 interposed, as shown in FIG. 10. Then, a coat 51 formed of polyimide or the like is formed so as to cover the electric wiring lines 31, and then the optical waveguide 32 is formed on the coat 51. According to this configuration, since the core 35 and the electric wiring lines 31 can be sealed with different constituent materials, constituent materials which are optimal for the respective conditions of the coat 51 and the cladding 34 can be freely selected.

Second Embodiment

Figure 11:
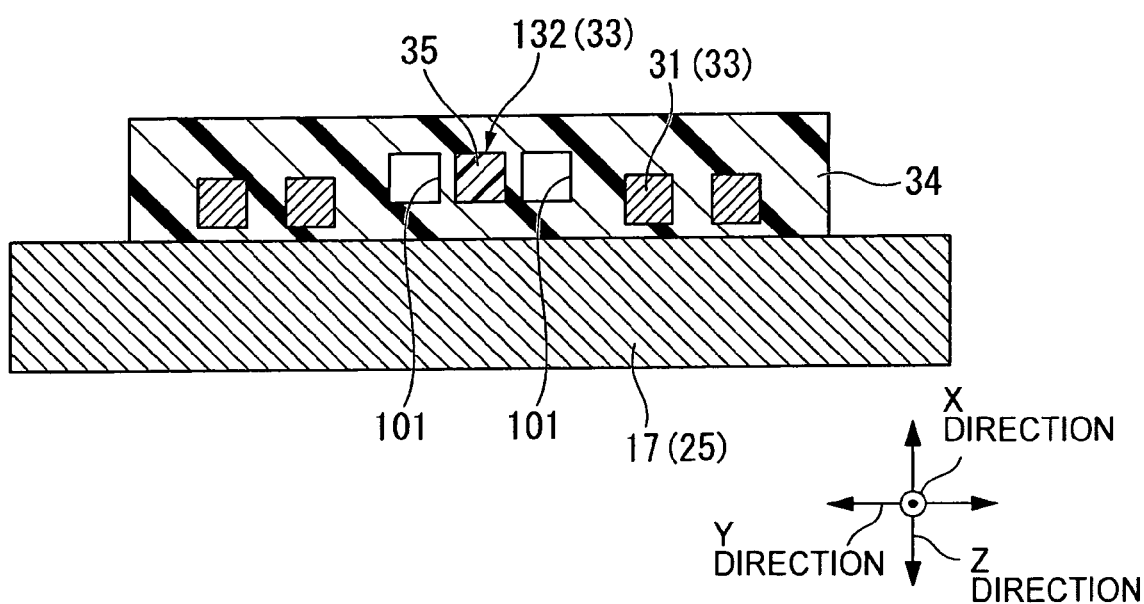
FIG. 11 is a cross-sectional view equivalent to the line A-A' of FIG. 3 which shows a second embodiment of the information recording and reproduction apparatus related to the present invention.

Next, a second embodiment of the present invention will be described. FIG. 11 is a cross-sectional view equivalent to the line A-A' of FIG. 3 which shows the second embodiment of the present invention. Moreover, in the following explanation, the same configurations as in the first embodiment described above are denoted by the same reference numerals and the explanation will be omitted.

As shown in FIG. 11, in an optical waveguide 132 of the present embodiment, a pair of tunnel portions 101 is formed at both sides of a core 35 in the Y-direction in a cladding 34. These tunnel portions 101 are spaces disposed to interpose the core 35 from both sides and extend in parallel to the extending direction of the core 35. That is, the cross section (YZ plane) of the tunnel portion 101, which is perpendicular to the extending direction and is formed in the cladding 34, is a rectangular space in plan view, and air or appropriate gas is filled inside. In addition, the inside of the tunnel portion 101 may be held in a vacuum state. That is, the refractive index of the tunnel portion 101 is about 1.

Therefore, according to the present embodiment, the same effects as in the first embodiment described above can be acquired, and the oscillation plane of a light beam L can be maintained in a fixed direction by disposing the tunnel portions 101 at both sides of the core 35 (holding of single polarization plane). For this reason, since only the linearly polarized light in a specific direction can be circulated in the core 35, it becomes possible to optimize the spot shape of light incident on the slider 2. Accordingly, spot light can be efficiently generated in a spot size converter 40.

In addition, the cross-sectional shape of the tunnel portion 101 is not limited to the rectangular shape and various shapes, such as a circular shape, may be adopted. In addition, two or more tunnel portions 101 may be provided. In addition, the layout design of the tunnel portions 101 may be appropriately changed. For example, a pair of tunnel portions 101 may be disposed at both sides of the core 35 in the X direction or the tunnel portions 101 may be disposed to surround the core 35.

Third Embodiment

Figure 12:
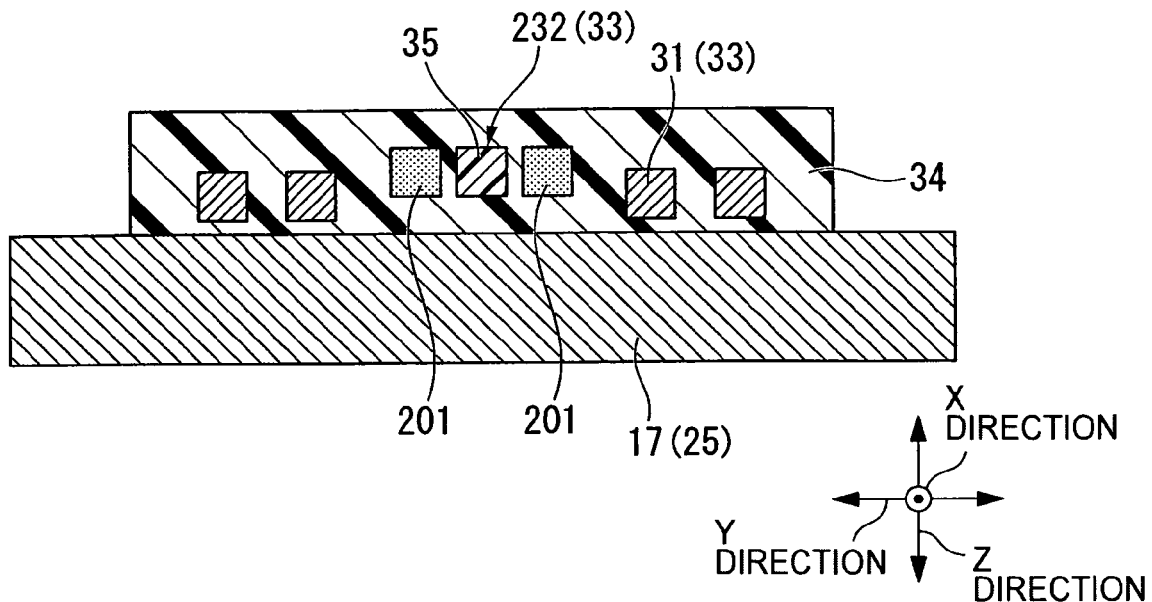
FIG. 12 is a cross-sectional view equivalent to the line A-A' of FIG. 3 which shows a third embodiment of the information recording and reproduction apparatus related to the present invention.

Next, a third embodiment of the present invention will be described. FIG. 12 is a cross-sectional view equivalent to the line A-A' of FIG. 3 which shows the third embodiment of the present invention. Moreover, in the following explanation, the same configurations as in the first embodiment described above are denoted by the same reference numerals and the explanation will be omitted.

As shown in FIG. 12, in an optical waveguide 232 of the present embodiment, a pair of stress applying portions 201 is formed at both sides of a core 35 in the Y-direction in a cladding 34. These stress applying portions 201 are disposed to interpose the core 35 from both sides, have rectangular sectional shapes, and extend in parallel to the extending direction of the core 35.

As a forming material of the stress applying portion 201, it is possible to adopt a material with a different coefficient of linear expansion from a material which forms the optical waveguide 232, for example, metal, such as aluminum and nickel, and synthetic resins, such as a liquid crystal polymer. In this case, compressive stress acts in a direction perpendicular to the extending direction of the core 35 by relative thermal expansion and thermal contraction of the stress applying portion 201 and the cladding 34.

Therefore, according to the present embodiment, compressive stress uniformly acts on the core 35 from both sides by disposing the stress applying portion 201 at both sides of the core 35 in the Y direction, similar to the second embodiment described above. Since the compressive stress causes birefringence in the core 35, the oscillation plane of the light beam L can be maintained in a fixed direction. As a result, the light beam L can be guided to the slider 2 while maintaining linear polarization.

Moreover, as a method of manufacturing the stress applying portion 201, the following method can be also used in addition to the method described above. That is, silica glass or the like is used as a forming material of the cladding 34, and an ion beam is irradiated to the forming area of the stress applying portion 201 of the cladding 34 so that only an irradiation area has a locally high density. Then, the irradiation area of an ion beam becomes the stress applying portion 201, and compressive stress acts from the stress applying portion 201 toward the core 35. In this case, since the compressive stress does not change with a temperature change, it is possible to form the highly reliable stress applying portion 201 without temperature dependency.

In addition, similar to the tunnel portion 101 of the second embodiment described above, the cross-sectional shape of the stress applying portion 201 is not limited to the rectangular shape and various shapes, such as a circular shape, may be adopted. In addition, two or more stress applying portions 201 may be provided. In addition, the layout design of the stress applying portions 201 may be appropriately changed. For example, a pair of stress applying portions 201 may be disposed at both sides of the core 35 in the X direction or the stress applying portions 201 may be disposed to surround the core 35.

Figure 13:
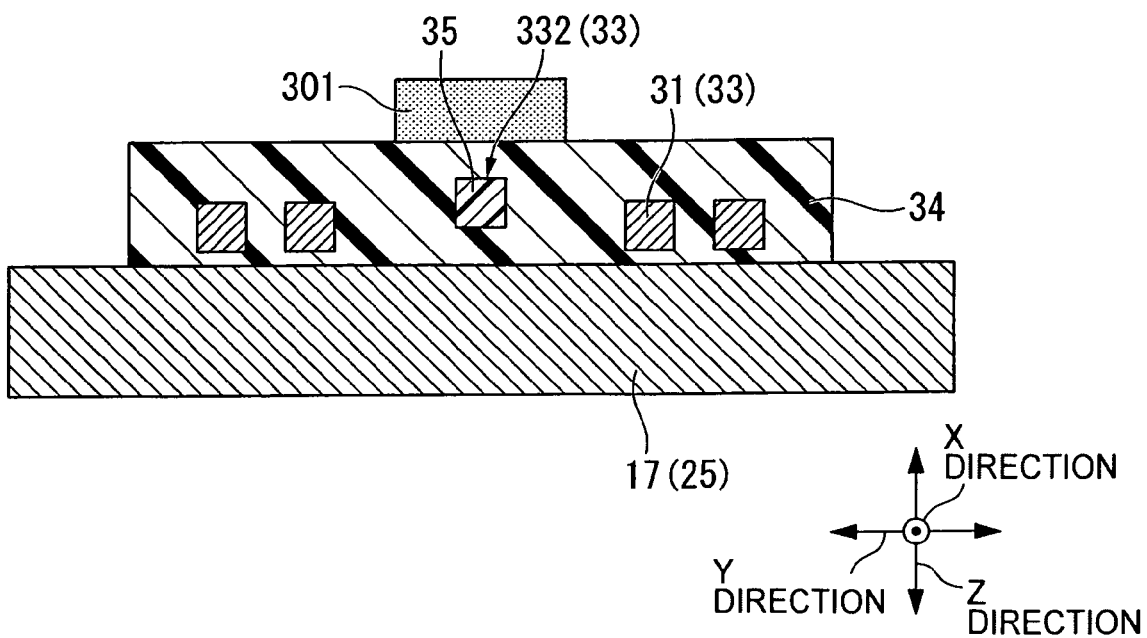
FIG. 13 is a cross-sectional view equivalent to the line A-A' of FIG. 3 which shows still another embodiment of the information recording and reproduction apparatus related to the present invention.

In addition, as the configuration of the stress applying portion, not only the configuration described above but also the following configuration is possible. For example, as shown in FIG. 13, an optical waveguide 332 includes a stress applying portion 301 disposed on the surface (surface facing the disk surface D1) of the cladding 34. The stress applying portion 301 is formed of the same forming material as the stress applying portion 201 described above and is disposed immediately above the core 35. In this case, from the stress applying portion 301, stress acts in a direction of compressing the core 35 from the upper side of the core 35. Accordingly, the same effects as in the second embodiment described above can be achieved. Moreover, according to this configuration, since a simple configuration is adopted in which the stress applying portion 301 is only disposed on the cladding 34, an decrease in the manufacturing efficiency can also be prevented.

Fourth Embodiment

Figure 14:
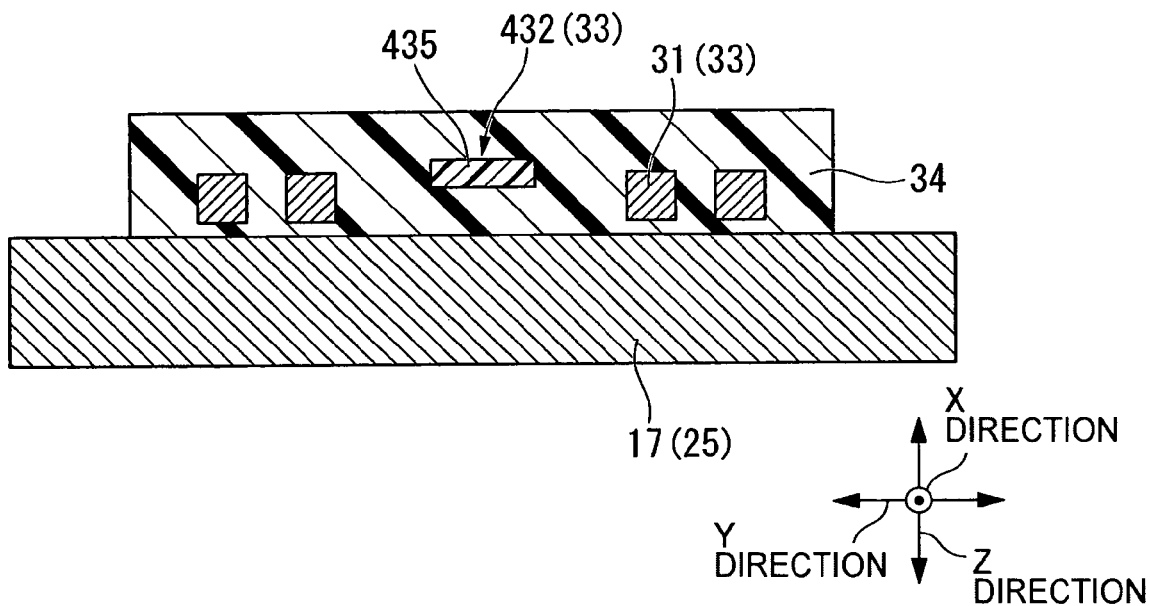
FIG. 14 is a cross-sectional view equivalent to the line A-A' of FIG. 3 which shows a fourth embodiment of the information recording and reproduction apparatus related to the present invention.

Next, a fourth embodiment of the present invention will be described. FIG. 14 is a cross-sectional view equivalent to the line A-A' of FIG. 3 which shows the fourth embodiment of the present invention. Moreover, in the following explanation, the same configurations as in the first embodiment described above are denoted by the same reference numerals and the explanation will be omitted.

As shown in FIG. 14, an optical waveguide 432 of the present embodiment is different from that of the first embodiment described above in that the cross section (YZ plane) perpendicular to the extending direction of the core 435 is formed in a rectangle shape. More specifically, the lengths of long and short sides of the core 435 on the YZ plane are set to be different from each other, and the core 435 is formed in a state where the long side direction is matched with a Y direction and the short side direction is matched with a Z direction. In this case, it is needless to say that the effects of the present invention are achieved if the length of the long side of the core 435 exceeds one time the length of the short side, and it is more preferable that the length of the long side is 1.1 times or more the length of the short side (that is, the aspect ratio is 1.1:1 or more).

Thus, similar to the second and third embodiments described above, the oscillation plane of the light beam L can be maintained in a fixed direction by making different the lengths of the long and short sides of the core 435 on the YZ plane. As a result, the light beam L can be guided to the slider 2 while maintaining linear polarization. In this case, the core 435 of the present embodiment can be manufactured by the same manufacturing method as the manufacturing method of the core 35 with a cross section of square shape like the first to third embodiments described above. That is, since only the film thickness of the core 435 is appropriately changed when manufacturing the optical waveguide 432 and the electric wiring line 31 collectively in a semiconductor process, an increase in the manufacturing cost and a lowering in the manufacturing efficiency can be prevented.

Figure 15:
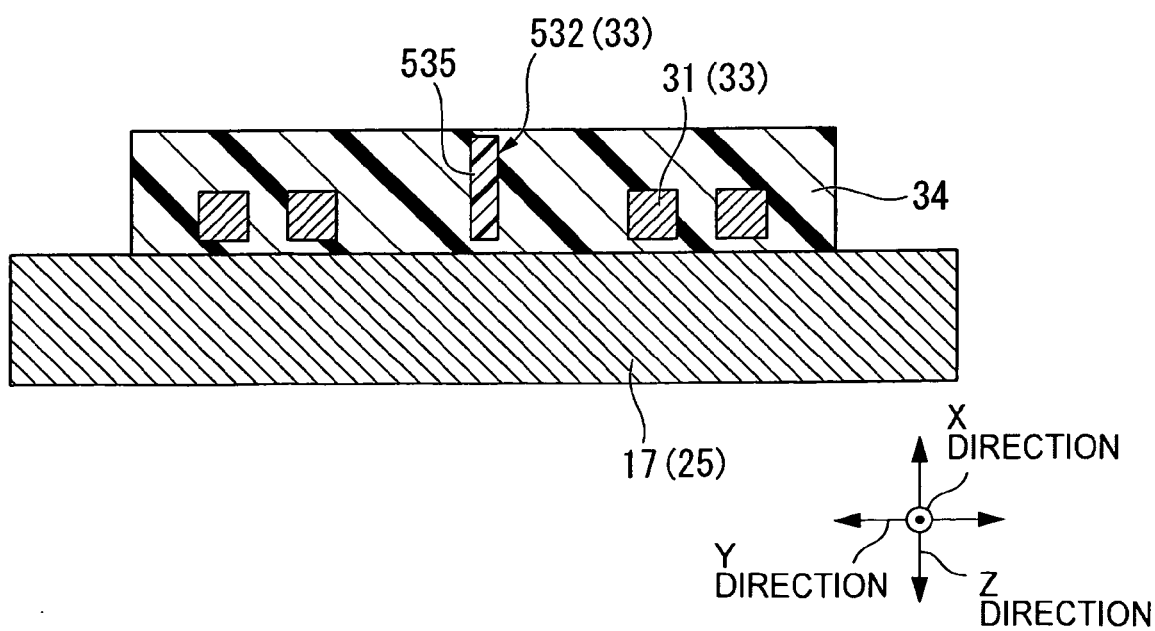
FIG. 15 is a cross-sectional view equivalent to the line A-A' of FIG. 3 which shows still another embodiment of the information recording and reproduction apparatus related to the present invention.

Moreover, as shown in FIG. 15, it is also possible to adopt an optical waveguide 532 in which the long side of a core 535 is matched with a Z direction and the short side is matched with a Y direction on the YZ plane. Also by this configuration, the same effects as the effects described above can be achieved. In addition, although not shown, the sectional shape of a core is not limited to the rectangular shape, and the design may be appropriately changed if it is a flat shape, such as an elliptical shape. Also in this case, it is preferable that the long axis of the core is set to one time of the short axis or more. More preferably, the ratio of the long and short axes is set to 1:1.1 or more. That is, it is preferable that the core is formed such that the lengths in two directions (Y and Z directions) perpendicular to the extending direction (X direction) are different.

Moreover, although the air floating type information recording and reproduction apparatus in which a slider was floated was described as an example in each of the embodiments described above, a disk and a slider may be in contact with each other as long as it is disposed so as to face the disk surface without being limited to the case. That is, the slider of the present invention may be a contact slider type slider. Also in this case, the same operations and effects can be achieved.

In addition, although the configuration in which a head gimbal assembly was provided at only one surface side of an arm portion was described in each of the embodiments, a configuration is also possible in which head gimbal assemblies are provided on both surfaces of an arm portion inserted between disks so as to face each disk. In this case, the information on the disk surface facing each slider can be recorded and reproduced by each slider of the head gimbal assembly provided at both surface sides of the arm portion. That is, since the information of two disks can be recorded and reproduced by one arm portion, it is possible to increase the recording capacity of an information recording and reproduction apparatus and to reduce the size of the apparatus.

In addition, the embodiments described above may be appropriately combined.

REFERENCE SIGNS LIST

D: disk (magnetic recording medium)
D1: disk surface (surface of magnetic recording medium)
1: information recording and reproduction apparatus
2: slider
5: control unit
10: pivot shaft
11: carriage
14: arm portion
15: base portion of carriage
16: gimbal means
20: laser light source (light source)
31: electric wiring line
32, 132, 232, 332, 432, 532: optical waveguide
33: photoelectric composite wiring line
34: cladding
35, 435, 535: core
50: base film
101: tunnel portion
201, 301: stress applying portion

The invention claimed is:

1. An information recording and reproduction apparatus comprising:
   a magnetic recording medium mounted to undergo rotation in a predetermined direction;
   a light source that emits a light beam to heat the magnetic recording medium;
   a carriage mounted to undergo rotation about a pivot shaft;
   a slider supported at a distal side of the carriage so as to face a surface of the magnetic recording medium, the slider having a spot light generating element that generates spot light from the light beam;
   a control unit that controls an operation of the slider; and
   a photoelectric composite wiring line in which an optical waveguide, which introduces the light beam emitted from the light source into the slider, and a plurality of electric wiring lines, which electrically connect the slider and the control unit to each other, are integrally formed, the optical waveguide being arranged between the plurality of electric wiring lines and being introduced into the slider in a state at being approximately straight;
   wherein information is recorded on the magnetic recording medium by heating the magnetic recording medium with the spot light generated by the slider and causing magnetization reversal by applying a recording magnetic field to the magnetic recording medium.

2. An information recording and reproduction apparatus according to claim 1; wherein the optical waveguide has a core that guides the light beam emitted from the light source in a total reflection condition, and has a cladding that is formed of a material with a refractive index lower than a refractive index of the core and that adheres to the core to seal the core, the electric wiring lines being sealed with the cladding together with the core.

3. An information recording and reproduction apparatus according to claim 2; wherein the core is disposed in approximately the middle on a cross section perpendicular to an extending direction of the cladding, and the plurality of electric wiring lines are disposed so as to be symmetric with respect to the core.

4. An information recording and reproduction apparatus according to claim 2; wherein in the core, the lengths of horizontal and vertical widths of a cross-sectional shape perpendicular to an extending direction of the core are set to be different.

5. An information recording and reproduction apparatus according to claim 2; wherein a tunnel portion is formed in the cladding along an extending direction of the core.

6. An information recording and reproduction apparatus according to claim 2; wherein the optical waveguide has at least one stress applying portion for applying compressive stress in a direction perpendicular to an extending direction of the core.

7. An information recording and reproduction apparatus according to claim 6; wherein the at least one stress applying portion comprises a pair of stress applying portions disposed so as to interpose both sides of the core.

8. An information recording and reproduction apparatus according to claim 6; wherein the stress applying portion is disposed on a surface of the cladding.

9. An information recording and reproduction apparatus according to claim 1; wherein the carriage includes a base portion mounted to undergo rotation around the pivot shaft, and includes an arm portion provided to extend from the base portion along a surface of the magnetic recording medium, the light source being disposed in the base portion.

10. An information recording and reproduction apparatus according to claim 9; wherein a terminal substrate electrically connecting the control unit and the slider to each other is provided in the base portion, the light source being disposed on the terminal substrate.

11. An information recording and reproduction apparatus according to claim 9; further comprising a suspension supported at a tip of the arm portion and formed so as to be flexibly deformable in a thickness direction of the suspension; gimbal means arranged on the suspension for supporting the slider such that the slider can pivot about two axes that are perpendicular to each other and parallel to the surface of the magnetic recording medium; and a flexibly deformable support arranged along a top of the suspension and extending from the gimbal means toward a base end of the suspension; wherein the photoelectric composite wiring line is disposed on the flexibly deformable support.

12. An information recording and reproduction apparatus according to claim 11; wherein the photoelectric composite wiring line is disposed on the support with a base film having an insulation property interposed therebetween.

* * * * *